United States Patent [19]

Sugio et al.

[11] Patent Number: 4,556,685

[45] Date of Patent: Dec. 3, 1985

[54] POLYPHENYLENE ETHER RESIN COMPOSITION

[75] Inventors: Akitoshi Sugio, Ohmiya; Masanobu Masu, Osaka; Toshihiko Kobayashi, Showa, all of Japan

[73] Assignee: Mitsubishi Gas Chemical Company, Inc., Tokyo, Japan

[21] Appl. No.: 660,428

[22] Filed: Oct. 10, 1984

[30] Foreign Application Priority Data

Oct. 13, 1983 [JP] Japan ................................ 58-191384

[51] Int. Cl.$^4$ ................................................ C08K 5/52
[52] U.S. Cl. ..................................... 524/141; 524/143; 525/68
[58] Field of Search .................. 524/141, 143; 525/68, 525/133

[56] References Cited

U.S. PATENT DOCUMENTS

| | | | |
|---|---|---|---|
| 3,819,761 | 7/1974 | Lee | 525/68 |
| 3,909,463 | 9/1975 | Hartman | 525/133 |
| 4,128,602 | 12/1978 | Katchman et al. | 525/133 |
| 4,293,660 | 10/1981 | Sugio et al. | 525/68 |

Primary Examiner—Veronica P. Hoke
Attorney, Agent, or Firm—Wenderoth, Lind & Ponack

[57] ABSTRACT

A polyphenylene ether resin composition comprising
  (A) a polyphenylene ether resin,
  (B) a polystyrene resin,
  (C) an acrylonitrile/conjugated diene elastomeric copolymer,
  (D) a graft copolymer obtained by reacting butyl rubber and an unsaturated polyolefin in a bifunctional phenol as a reaction medium, and
  (E) an aromatic phosphate.

2 Claims, No Drawings

POLYPHENYLENE ETHER RESIN COMPOSITION

This invention relates to a polyphenylene ether resin composition, and more specifically, to a polyphenylene ether resin composition having high impact strength.

Polyphenylene ether resins are thermally stable resins having excellent mechanical and electrical properties, but are difficult to mold because of their high glass transition temperature and poor oxidation stability at high temperatures. Their impact strength, especially notched Izod impact strength, is inferior to certain kinds of resins. It has been desired therefore to improve the moldability and impact strength of the polyphenylene ethers.

In order to improve the moldability of polyphenylene ethers, a method was proposed in which polystyrene is blended with the polyphenylene ethers (see U.S. Pat. No. 3,383,435, and Japanese Patent Publication Nos. 22069/1967 and 17812/1968). The resulting blends of polyphenylene ethers and polystyrene show improved moldability over the polyphenylene ethers, but fail to show entirely satisfactory impact strength in practical applications.

Blending of a rubbery polymer to a polyphenylene ether resin was also proposed in order to improve the impact strength of the polyphenylene ether (see U.S. Pat. Nos. 3,660,531 and 3,994,856 and Japanese Patent Publication No. 32731/1972). A blend of the polyphenylene ether and the rubbery polymer obtained by such a method shows improved impact strength over the polyphenylene ether, but on the other hand, the incorporation of the rubbery polymer increases the melt viscosity of the blend and its moldability is rather reduced.

A method was also proposed in which a polyolefin is blended with the polyphenylene ether to improve its impact strength and moldability (see U.S. Pat. No. 3,361,851). However, the polyphenylene ether has poor compatibility with the polyolefin, and Example 3 of this patent specification shows that when, for example, the proportion of polyethylene blended increases above 7.5%, the tensile elongation of the blend abruptly decreases.

Attempts have also been made to improve the impact strength of a resin composition of a polyphenylene ether and polystyrene having improved moldability (U.S. Pat. Nos. 3,660,531, 3,994,856 and 3,835,200, Japanese Laid-Open Patent Publication No. 88960/1979 and Japanese Patent Publication No. 500153/1982). According to these attempts, the impact strength of the resin composition comprising the polyphenylene ether and polystyrene is improved by incorporating an elastomer. But the moldability of the composition is rather reduced, and the characteristic fire retardancy of the polyphenylene ether is reduced and it is no longer self-extinguishing.

Japanese Patent Publication No. 418/1978 teaches the incorporation of an aromatic phosphate in order to impart fire retardancy to the resin composition of the polyphenylene ether and polystyrene. The incorporation of the aromatic phosphates, however, reduces the heat resistance of the composition.

The present inventors made extensive investigations in view of the defects of the prior attempts to modify polyphenylene ether resins, and have found that by incorporating specified components to be described hereinbelow, high impact strength can be imparted to a resin composition comprising a polyphenylene ether and polystyrene, and there can be obtained a resin composition which also has heat resistance and fire retardancy and shows a good balance in various practical properties. This discovery has led to the present invention.

It is an object of this invention to provide a novel polyphenylene ether resin composition.

Another object of this invention is to provide a novel polyphenylene ether resin composition having not only high impact strength but also heat resistance and fire retardancy.

Still another object of this invention is to provide a polyphenylene ether resin composition having a good balance in various practical properties including the aforesaid properties.

Further objects and advantages of this invention will become apparent from the following description.

According to this invention, the above objects and advantages are achieved by a polyphenylene ether resin composition comprising (A) a polyphenylene ether resin,
(B) a polystyrene resin,
(C) an acrylonitrile/conjugated diene elastomeric copolymer,
(D) a graft copolymer obtained by reacting butyl rubber and an unsaturated polyolefin in a bifunctional phenol as a reaction medium, and
(E) an aromatic phosphate.

The polyphenylene ether resin composition of this invention contains components (A), (B), (C), (D) and (E) as essential components. For example, if the composition lacks component (C), its impact strength is markedly reduced. If it lacks component (D), component (C) must be incorporated in a considerably great amount in order to maintain the desired impact strength of the composition. Consequently, the composition lacking component (D) has a reduced melt flow, and molded articles obtained from such a composition have a poor appearance. In view of this, the effect of maintaining the various properties in a well balanced combination by the combination of the above components in this invention is believed to be unique.

The polyphenylene ether resin (A) constituting the resin composition of this invention denotes a homo- or co-polymer of phenylene ether, and a grafted polyphenylene ether polymer obtained by grafting an aromatic vinyl compound to such the homo- or co-polymer.

Preferably, the homopolymer or copolymer of polyphenylene ether is obtained by polycondensing a monocyclic phenol represented by the following formula

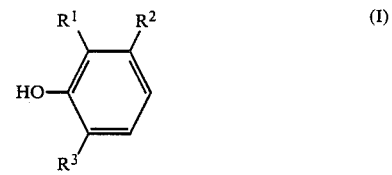

wherein $R^1$ represents a lower alkyl group having 1 to 3 carbon atoms, and $R^2$ and $R^3$, independently from each other, represent a hydrogen atom or an alkyl group having 1 to 3 carbon atoms.

The homopolymer can be obtained from a single monocyclic phenol, and the copolymer, from two or more monocyclic phenols.

The alkyl group having 1 to 3 carbon atoms in general formula (I) denotes methyl, ethyl, n-propyl and iso-propyl groups.

Examples of the monocyclic phenol of general formula (I) include 2,6-dimethylphenol, 2,6-diethylphenol, 2,6-dipropylphenol, 2-methyl-6-ethylphenol, 2-methyl-6-propylphenol, 2-ethyl-6-propylphenol, o-cresol, 2,3-dimethylphenol, 2,3-diethylphenol, 2,3-dipropylphenol, 2-methyl-3-ethylphenol, 2-methyl-3-propylphenol, 2-ethyl-3-methylphenol, 2-ethyl-3-propylphenol, 2-propyl-3-methyhlphenol, 2-propyl-3-ethylphenol, 2,3,6-trimethylphenol, 2,3,6-triethylphenol, 2,3,6-tripropylphenol, 2,6-dimethyl-3-ethylphenol and 2,6-dimethyl-3-propylphenol. Accordingly, examples of polyphenylene ether resins obtained by polycondensing these monocyclic phenols include homopolymers such as poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether and poly(2-ethyl-6-propyl-1,4-phenylene)ether, and copolymers such as 2,6-dimethylphenol/2,3,6-trimethylphenol copolymer, 2,6-dimethylphenol/2,3,6-triethylphenol copolymer, 2,6-diethylphenol/2,3,6-trimethylphenol copolymer and 2,6-dipropylphenol/2,3,6-trimethylphenol copolymer.

Of these, poly(2,6-dimethyl-1,4-phenylene)ether and 2,6-dimethylphenol/2,3,6-trimethylphenol copolymer are preferred.

Preferred as the aforesaid grafted polymer is a graft polymer obtained by grafting an aromatic vinyl compound represented by the following formula (II)

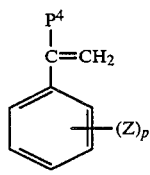
(II)

wherein $R^4$ represents a hydrogen atom or a lower alkyl group, Z represents a halogen atom or a lower alkyl group, and p is 0 or an integer of 1 to 3, to the polyphenylene ether homo- or co-polymer. The grafted polymer can be produced, for example, by the method described in Japanese Laid-Open Patent Publication No. 126,800/1975. Examples of the aromatic vinyl compound are styrene, alpha-methylstyrene, vinyltoluene, vinylxylene, ethyl styrene, n-propylstyrene, iso-propylstyrene, chlorostyrene and bromostyrene.

Especially preferred grafted polymers are a graft polymer obtained by grafting styrene to poly(2,6-dimethyl-1,4-phenylene)ether and a graft polymer obtained by grafting styrene to 2,6-dimethylphenol/2,3,6-trimethylphenol copolymer.

The polystyrene resin (B) is preferably one containing at least 25% by weight of structural units of the following formula (III)

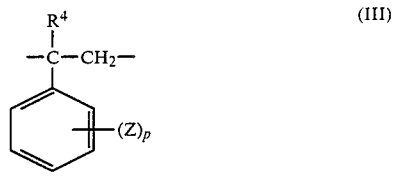

wherein $R^4$, Z and p are as defined with regard to formula (II).

The lower alkyl group for $R^4$ and Z in formula (III) is preferably an alkyl group having 1 to 3 carbon atoms, such as methyl, ethyl, n-propyl and isopropyl.

The halogen atom for Z in formula (III) is preferably chlorine or bromine.

The structural units of formula (III) are derived from a styrene monomer of the above formula (II).

Examples of preferred polystyrene resins are polystyrene, polychlorostyrene, high-impact polystyrene (rubber-modified polystyrene), styrene/acrylonitrile copolymer, styrene/butadiene copolymer, styrene/butadiene/acrylonitrile copolymer, styrene/alphamethylstyrene copolymer and styrene/butadiene resinous block copolymer.

Among these, high-impact polystyrene is especially preferred. The high-impact polystyrene includes rubber-modified polystyrene resins obtained by modifying polystyrene with elastomers such as polybutadiene, butadiene-styrene copolymer rubber or EPDM. The rubber-modified polystyrene denotes a resin having an elastomer phase in the form of particles dispersed in a matrix of polystyrene. Such a resin can be formed by mechanically mixing polystyrene with an elastomer, or by copolymerizing an elastomer with a styrene-type monomer. Resins obtained by the latter method are preferably used in this invention. Industrially, the rubber-modified polystyrene resin is produced by graft polymerizing a styrene-type monomer in the presence of an elastomer.

The polystyrene resin (B) may be one of the above-exemplified resins, or a mixture of two or more of them.

The acrylonitrile/conjugated diene elastomeric copolymer (C) used in the composition of this invention may, for example, be a rubbery substance obtained by polymerizing a monomeric mixture composed of 10 to 50% by weight, preferably 20 to 45% by weight, of acrylonitrile and 50 to 90% by weight, preferably 55 to 80% by weight, of a conjugated diene compound. The elastomeric copolymer includes nitrile rubber which is easily available commercially. Examples of the conjugated diene compound include butadiene, isoprene and 1,3-pentadiene. Butadiene is particularly suitable.

The graft copolymer (D) used in the composition of this invention denotes a copolymer obtained by graft-polymerizing an unsaturatred polyolefin and an unvulcanized butyl rubber having an unsaturated bond in the presence of a bifunctional phenol as a grafting medium. More specifically, the graft copolymer (D) used in this invention can be produced by using 40 to 99 parts by weight of the unsaturated polyolefin and 60 to 1 part by weight of the butyl rubber (the total amount of these compounds is 100 parts by weight), mixing them with 0.3 to 5 parts by weight, per 100 parts by weight of the unsaturated polyolefin and the butyl rubber combined, of the bifunctional phenol as a grafting medium, and heating the mixture. The process of producing this graft copolymer is disclosed in the specification of U.S. Pat. No. 3,909,463. Such a graft copolymer is commercially available, for example under the trade name "ET-Polymer" from Asia Cabel Company, Sweden. If desired, a polymer obtained by further subjecting this graft copolymer and an unsaturated polyolefin to a grafting reaction can also be used in this invention.

The unsaturated polyolefin used in preparing the graft copolymer (D) is preferably a polymer derived from at least one alpha-olefin of the group consisting of ethylene, propylene, butene-1, etc., and includes, for example, such homopolymers as polyethylene, polypropylene and polybutene-1 and such copolymers as ethylene/propylene copolymer.

Polyethylene is preferred among these unsaturated polyolefins, and may be of the low to high density type produced by any of the known low, medium and high pressure methods.

Preferably, the unsaturated polyolefin has a number average molecular weight of at least 8,000 and contain 0.05 to 0.5% by weight unsaturated bonds on an average per molecular chain.

The butyl rubber used in the preparation of the graft copolymer (B) is known per se, and is a synthetic rubber obtained by copolymerizing isobutylene with a small amount of a diolefin. Usually, the butyl rubber preferably contains 1 to 8% by weight of the diolefin.

Examples of the bifunctional phenol used as a grafting medium in the graft polymerization include monomeric phenol dialcohols such as 2,6-dimethylol-4-tert.-butylphenol, 2,6-dimethylol-4-phenylphenol and 2,6-dimethylol-4-cyclohexylphenol; polymeric compounds having two methylol groups obtained by the condensation of p-substituted phenols and formaldehyde; and halogen-substitution products of these obtained by substituting halogens for the hydroxyl groups of the methylol groups. These phenols are bifunctional in that they have two active hydroxyl groups or halogens at the ortho-position. A bromination product of a condensate between p-methylphenol and formaldehyde may be cited as an example of the polymeric bifunctional phenols. This compound is commercially available under the trade name "SP-1055".

The aromatic phosphate (E) to be incorporated in the composition of this invention may be a compound represented by the general formula (IV)

wherein each of $R^5$, $R^6$ and $R^7$ represents an alkyl group, preferably an alkyl group having 2 to 18 carbon atoms, an aryl group, preferably a phenyl group, or an alkyl-substituted aryl group, preferably a phenyl group substituted by an alkyl group having 1 to 10 carbon atoms, and at least one of $R^5$, $R^6$ and $R^7$ is the aryl or the alkyl-substituted aryl group.

Specific examples of the aromatic phosphate (E) are cresyldiphenyl phosphate, tricresyl phosphate, triisopropylphenyl phosphate, triphenyl phosphate, isooctyldiphenyl phosphate and didecylcresyl phosphate. They may be used either singly or in combination. Triphenyl phosphate and triisopropylphenyl phosphate are preferred.

The polyphenylene ether resin composition of this invention preferably contains 60 to 90% by weight of component (A), 10 to 30% by weight of component (B), 2 to 15% by weight of component (C) and 2 to 10% by weight of component (D) based on the total weight of components (A), (B), (C) and (D).

Preferably, the resin composition of this invention contains 5 to 20 parts by weight of component (E) per 100 parts by weight of components (A), (B), (C) and (D) combined.

There is no particular restriction on the method of preparing the composition of this invention. For example, there can be used a method which comprises melting and kneading the individual ingredients of the composition by means of an extruder, a Banbury mixer, a kneader, etc., or a method which comprises first melting and kneading the nitrile rubber in bale form and the polystyrene resin by a Banbury mixer or an extruder to mold the mixture into pellets or small cubes, mixing them with the other ingredients, and melting and kneading the mixture by an extruder.

As required, the composition of this invention may further include various additives such as elastomers other than the elastomer (C), stabilizers, plasticizers, lubricants, mold releasing agents and fire retardants; pigments; and fillers. Examples of the elastomers other than the elastomer (C) are EPDM, EP rubber, styrene-butadiene rubber, and A-B-A' type block copolymer elastomer. It is preferred in particular to use the A-B-A' type block copolymer elastomer or a mixture of it with EP rubber as the elastomer component, and this further increases the impact strength of the resin composition of this invention. The degree of increase is unexpectedly remarkable, presumably owing to the synergistic effect of the elastomer component combined. Examples of the other additional components include olefin waxes as lubricants typified by polyethylene wax and polypropylene wax; bromine-containing fire retardants typified by decabromobiphenyl, pentabromotoluene and decabromobiphenyl ether; pigments typified by titanium dioxide, zinc sulfide and zinc oxide; inorganic fillers typified by glass fibers, asbestos, wollastonite, mica, talc, clay, copper flakes, aluminum flakes, nickel flakes and stainless steel fibers; and organic fillers typified by carbon fibers.

The following Examples illustrate the polyphenylene ether resin composition of this invention more specifically.

EXAMPLE 1

Seventy parts by weight of a copolymer of 2,6-dimethylphenol/2,3,6-trimethylphenol having an inherent viscosity, measured in chloroform at 25° C., of 0.53 dl/g (to be referred to as the phenylene ether copolymer; containing 5 mole % of 2,3,6-trimethylphenyl on a monomer basis), 18 parts by weight of rubber-modified polystyrene containing 18% by weight of a styrene-grafted polybutadiene gel phase (the polystyrene matrix having an inherent viscosity, measured in chloroform at 25° C., of 0.85 dl/g), 4 parts by weight of nitrile rubber having a bonded acrylonitrile content of 29% and a Mooney viscosity of 78, 6 parts by weight of a graft copolymer obtained by subjecting butyl rubber and low-density polyethylene in a weight ratio of 1:1 to graft copolymerization ("ET-Polymer", a trade name for a product of Asia Cabel Company), and 9.5 parts by weight of triphenyl phosphate were first mixed by a Henschel mixer. The mixture was then kneaded and extruded by a twin-screw extruder, and pelletized by a pelletizer.

The resulting pellets were molded into various test pieces by using a molding machine, and the various properties of the test pieces were measured. The results are shown in Table 1.

COMPARATIVE EXAMPLE 1

A resin composition was prepared, and its properties measured, in the same way as in Example 1 except that the nitrile rubber was not incorporated, and the amount of the "ET-Polymer" was changed to 10 parts by weight. The results are also shown in Table 1.

TABLE 1

| Properties | Example 1 | Comparative Example 1 |
|---|---|---|
| Notched Izod impact strength (⅛ inch thick) (kg-cm/cm) | 35 | 20 |
| Heat distortion temperature (264 psi) (°C.) | 122 | 120 |
| Fire retardancy (1/16 inch thick) | UL 94V-1 | UL 94HB |

EXAMPLES 2-4

Test pieces were prepared by the same operation as in Example 1 except that the same ingredients as used in Example 1 were mixed in the proportions (parts by weight) shown in Table 2. The properties of the test pieces were measured, and the results are shown in Table 3.

TABLE 2

| Ingredient | Example 2 | Example 3 | Example 4 |
|---|---|---|---|
| Phenylene ether copolymer | 65 | 75 | 68 |
| Rubber-modified polystyrene | 25 | 15 | 20 |
| Nitrile rubber | 2 | 2 | 5 |
| ET-polymer | 8 | 8 | 7 |
| Triphenyl phosphate | 8 | 10 | 9 |

TABLE 3

| Properties | Example 2 | Example 3 | Example 4 |
|---|---|---|---|
| Heat distortion temperature (°C.) (264 psi) | 121 | 126 | 122 |
| Notched Izod impact strength (kg-cm/cm) | 36 | 35 | 38 |
| Fire retardancy | UL 94V-1 | UL 94V-1 | UL 94V-1 |

EXAMPLE 5

A pelletized composition was prepared in the same way as in Example 1 by using 65 parts by weight of poly(2,6-dimethyl-1,4-phenylene)ether having an inherent viscosity, measured in chloroform at 25° C., of 0.55 dl/g, 9 parts by weight of the same rubber-modified polystyrene as used in Example 1, 4 parts by weight of pellets obtained by kneading a 1:1 by weight mixture of the same rubber-modified polystyrene as used in Example 1 and nitrile rubber having a bonded acrylonitrile content of 41% and a Mooney viscosity of 83 in an extruder, 16 parts by weight of pellets obtained by kneading in an extruder a 1:1 by weight mixture of the same rubber-modified polystyrene as used in Example 1 and a graft copolymer obtained by graft-copolymerizing butyl rubber and high-density polyethylene in a weight ratio of 1:3, 6 parts by weight of pellets obtained by kneading the same rubber-modified polystyrene as used in Example 1 and a triblock copolymer of polystyrene/polybutadiene/polystyrene (styrene content 23%) in a 1:1 weight ratio in an extruder, and 8 parts by weight of triisopropylphenyl phosphate. The resulting pellets were injection-molded and tested for their properties. They were found to have a heat distortion temperature of 120° C., a notched Izod impact strength of 39 kg-cm/cm and a fire retardancy of UL 94V-1.

EXAMPLE 6

Seventy parts by weight of the same phenylene ether copolymer as used in Example 1, 11 parts by weight of the same rubber-modified polystyrene as used in Example 1, 6 parts by weight of pellets obtained by kneading the same rubber-modified polystyrene as used in Example 1 and the same triblock copolymer as used in Example 5 in a weight ratio of 1:1 in an extruder, 5 parts by weight of pellets obtained by kneading the same rubber-modified polystyrene as used in Example 1 and the same nitrile rubber as used in Example 1 in a weight ratio of 3:2 in an extruder, 8 parts by weight of the same ET-Polymer as used in Example 1, 10 parts by weight of triphenyl phosphate, 5 parts by weight of titanium dioxide and 1 part by weight of an antioxidant were mixed by a Henschel mixer. The resulting mixture was melted and kneaded by a twin-screw extruder and pelletized by a pelletizer.

The resulting pellets were molded into various test pieces by an injection molding machine, and their properties were measured. The results are shown below.

Heat distortion temperature (264 psi): 122° C.
Notched Izod impact strength: 45 kg-cm/cm
Tensile strength: 550 kg/cm$^2$
Elongation: 60%
Fire retardancy: UL 94V-1
Melt flow value (determined by a "Koka-type" flow tester at 230° C. under a load of 60 kg): $2 \times 10^{-3}$ cc/sec.

EXAMPLE 7

Sixty-eight parts by weight of the same phenylene ether copolymer as used in Example 1, 18 parts by weight of the same rubber-modified polystyrene as used in Example 1, 3 parts by weight of the same nitrile rubber as used in Example 1, 8 parts by weight of the same ET-Polymer as used in Example 1, 3 parts by weight of polystyrene/polyisoprene/polystyrene block elastomeric copolymer (the weight ratio of the polystyrene portion to the polyisoprene portion was 14:86; a 25% toluene solution of the copolymer had a viscosity of 1600 cps measured at 25° C. by using a Brookfield viscometer, Model RVT), and 12 parts by weight of triphenyl phosphate were fully mixed in a Henschel mixer. The mixture was melted, kneaded and extruded by a twin-screw extruder, and pelletized by a pelletizer. The pellets were molded into various test pieces by an injection molding machine, and their properties were measured. The results are shown in Table 4.

EXAMPLE 8

A pelletized composition was prepared in the same way as in Example 7 except that the polystyrene/polyisoprene/polystyrene elastomeric block copolymer was not used, the amount of the nitrile rubber was changed to 3.8 parts by weight, and the amount of the ET-Polymer was changed to 10.2 parts by weight. The properties of the resulting test pieces are shown in Table 4.

TABLE 4

| Properties | Example 7 | Example 8 |
| --- | --- | --- |
| Notched Izod impact strength (kg-cm/cm; ⅛ inch thick) | 50 | 40 |
| Heat distortion temperature (°C.; 264 psi) | 117 | 118 |
| Fire retardancy (1/16 inch thick) | UL 94V-1 | UL 94V-1 |

EXAMPLE 9

A pelletized composition was prepared, and test pieces were molded from it, in the same way as in Example 7 except that the amount of the ET-Polymer was changed to 7 parts by weight, and 1 part by weight of an ethylene/propylene elastomeric copolymer ("Tafmer" P0680, a trade name for a product of Mitsui Petrochemical Industries, Ltd.; having a glass transition temperature of −49° C. and a reduced specific viscosity, determined at 135° C. in decalin solvent in a polymer concentration of 0.1 g/100 ml, of 2.0) was additionally incorporated. The properties of the test pieces were as follows:
Notched Izod impact strength (kg-cm/cm; ⅛ inch): 52
Heat distortion temperature (°C., 264 psi): 118
Fire retardancy (1/16 inch thick): UL 94V-1

What is claimed is:

1. A polyphenylene ether resin composition comprising
   (A) a polyphenylene ether resin,
   (B) a polystyrene resin,
   (C) an acrylonitrile/conjugated diene elastomeric copolymer,
   (D) a graft copolymer obtained by reacting butyl rubber and an unsaturated polyolefin in a bifunctional phenol as a reaction medium, and
   (E) an aromatic phosphate wherein the resin composition comprises 60 to 90% by weight of component (A), 10 to 30% by weight of component (B), 2 to 15% by weight of component (C), 2 to 10% by weight of component (D) and 5 to 20 parts by weight of component E per 100 parts by weight of components (A), (B), (C) and (D) combined.

2. The resin composition of claim 1 wherein the polyphenylene ether resin is a homopolymer of phenylene ether, a copolymer of phenylene ether or a grafted polyphenylene ether polymer.

* * * * *